(12) United States Patent
Yanagi

(10) Patent No.: US 7,899,920 B2
(45) Date of Patent: Mar. 1, 2011

(54) NETWORK APPARATUS CAPABLE OF HANDLING RESERVATION COMMANDS

(75) Inventor: Satoru Yanagi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 316 days.

(21) Appl. No.: 12/163,221

(22) Filed: Jun. 27, 2008

(65) Prior Publication Data

US 2009/0006656 A1    Jan. 1, 2009

(30) Foreign Application Priority Data

Jun. 29, 2007    (JP) .............................. 2007-171748

(51) Int. Cl.
G06F 15/16    (2006.01)
G06F 3/00    (2006.01)

(52) U.S. Cl. ........................ 709/229; 709/225; 709/226; 709/227; 710/3; 710/16; 710/37; 710/38; 710/39; 710/40; 370/449; 370/450; 370/451; 370/455

(58) Field of Classification Search .................... 710/36
See application file for complete search history.

(56) References Cited

U.S. PATENT DOCUMENTS

| | | | | |
|---|---|---|---|---|
| 4,207,609 A * | 6/1980 | Luiz et al. | ........................ | 710/38 |
| 4,455,605 A * | 6/1984 | Cormier et al. | ............... | 710/38 |
| 6,170,020 B1 * | 1/2001 | Blakeney et al. | ............... | 710/10 |
| 6,301,012 B1 * | 10/2001 | White et al. | ................ | 358/1.15 |
| 6,327,613 B1 * | 12/2001 | Goshey et al. | ............... | 709/208 |
| 6,470,382 B1 * | 10/2002 | Wang et al. | .................. | 709/220 |
| 6,473,783 B2 * | 10/2002 | Goshey et al. | ............... | 709/203 |
| 6,760,306 B1 * | 7/2004 | Pan et al. | ..................... | 370/230 |
| 7,185,360 B1 * | 2/2007 | Anton et al. | .................... | 726/3 |
| 7,277,952 B2 * | 10/2007 | Nishanov et al. | ............ | 709/229 |
| 7,284,061 B2 * | 10/2007 | Matsubayashi et al. | ..... | 709/229 |
| 7,362,458 B2 | 4/2008 | Adachi | | |
| 7,716,406 B1 * | 5/2010 | Tyndall | ....................... | 710/200 |

(Continued)

FOREIGN PATENT DOCUMENTS

JP    2001-236301    8/2001

(Continued)

OTHER PUBLICATIONS

'Universal Serial Bus Specification' Revision 2.0, Apr. 27, 2000, pp. 250-254, 261-263, 274, 291.*

*Primary Examiner*—Henry W Tsai
*Assistant Examiner*—Steven G Snyder
(74) *Attorney, Agent, or Firm*—Banner & Witcoff, Ltd.

(57) ABSTRACT

A network apparatus is provided that is capable of requiring a reservation for an access right to a peripheral device that is not yet connected to the network apparatus from one of the terminals on a network. A server (network apparatus) may receive a reservation command and a sender identifier (ID) from one of the terminals on the network that requests to reserve an access right for a peripheral device that is not yet connected to the server. In a case where a new connection of a peripheral device is detected, the server allows the terminal identified by the sender ID that accompanied the reservation command to access the peripheral device. While the reservation is established, access to the detected peripheral device from senders other than the identified terminal is rejected.

12 Claims, 10 Drawing Sheets

U.S. PATENT DOCUMENTS

2002/0059372 A1* 5/2002 Goshev et al. .............. 709/203
2002/0174228 A1* 11/2002 Kanemaki et al. ........... 709/226
2005/0163143 A1* 7/2005 Kalantar et al. ............. 370/431
2006/0031888 A1* 2/2006 Sparrell ...................... 725/78
2008/0049644 A1* 2/2008 Halbert ....................... 370/254
2008/0147896 A1* 6/2008 Soukko ......................... 710/8
2008/0235379 A1* 9/2008 Monette ..................... 709/226
2009/0019187 A1* 1/2009 Okuma ......................... 710/9

FOREIGN PATENT DOCUMENTS

JP 2001-243156 9/2001
JP 2004-78359 3/2004

* cited by examiner

NETWORK APPARATUS CAPABLE OF HANDLING RESERVATION COMMANDS

CROSS-REFERENCE TO RELATED APPLICATION

This application claims priority to Japanese Patent Application No. 2007-171748, filed on Jun. 29, 2007, the contents of which are hereby incorporated by reference into the present application.

BACKGROUND OF THE INVENTION

1. Field of the Invention

A technique disclosed in the present specification relates to a network apparatus which is capable of being connected to a network and with peripheral devices, and controls accesses to the peripheral devices from terminals on the network. More particularly, the technique relates to a network apparatus which is capable of reserving an access right to a peripheral device that is not yet connected to the apparatus, from one of the terminals on a network, and prevents the peripheral device from being accessed from other terminals on the network after the device has been connected to the apparatus.

2. Description of the Related Art

Peripheral devices that are connected to an apparatus connected to a network and not having direct connection to the network are widely known. Such peripheral devices can be accessed from terminals on the network. In such peripheral devices, USBs and RS232Cs for example are often used as interfaces. In general, peripheral devices directly connected to a network can be accessed from plural terminals simultaneously through the network. However, each of the peripheral devices connected to the apparatus via a USB or the like only allow one-to-one access between the device itself and the apparatus accessing the device. In this specification, a peripheral device which makes one-to-one access between the device itself and an apparatus connected therewith is referred to as "single-access peripheral device" or, simply, "peripheral device", in regards to the characteristic of such "peripheral device" not being able to accept simultaneous accesses from plural terminals. In addition, the term "access" as used in the specification refers to the transmission, e.g. sending and receiving, of data to and from a peripheral apparatus. In other words, "access" refers to communication between peripheral apparatus and terminal.

Such peripheral devices are each connected with a terminal capable of being connected to a network, and can be utilized by the other terminals on the network via the connected terminal; however, each of the peripheral devices cannot be accessed from plural terminals simultaneously and therefore, when the user of one terminal accesses the peripheral device, the users of the other terminals cannot access the peripheral device. For example, when the peripheral device is a scanner, there may be a case where a user inserts a document into the scanner, and while the user goes back to the place where his/her terminal is set, another user may operate the scanner before the initial user utilizes the scanner. To deal with such undesirable condition, Japanese Patent Application Publication No. 2001-236301 discloses an apparatus to which peripheral devices can be connected, and allows an access right reservation to one of the peripheral device for the user of the terminal. In the following, an apparatus capable of being connected to a network and to which peripheral devices can be connected is simply referred to as "network apparatus."

BRIEF SUMMARY OF THE INVENTION

When peripheral devices have already been connected to a network apparatus, it is possible for both the network apparatus and the terminals to recognize what kind of peripheral devices are connected, and reservations of the peripheral devices can be made according to the technique described in Japanese Patent Application Publication No. 2001-236301. Incidentally, peripheral devices connected to a network apparatus on a one-to-one basis can be easily attached thereto and detached therefrom because of a simple protocol for establishing logical connection (that is, a connection viewed from a software standpoint). Therefore, there may be a situation where, after newly connecting a peripheral device to a network apparatus, the user goes back to his/her terminal to use the newly connected peripheral device. For example, there is a case where, after newly connecting a scanner with documents inserted to a network apparatus, the user goes back to the place where his/her terminal is set to use the scanner. In the network apparatus disclosed in Japanese Patent Application Publication No. 2001-236301, an access right reservation is not allowed for peripheral device that is unconnected at the time of requesting the reservation, because the peripheral device cannot be identified. Accordingly, such a network apparatus, when newly connected with a peripheral device by a user, allows another user to access the newly connected peripheral device before the user who set up the connection accesses to the device. In order to solve such a problem, the present invention has been accomplished. The present specification discloses a network apparatus which is capable of reserving an access right to peripheral devices that are yet unconnected from one of the terminals on the network.

The network apparatus disclosed in this specification can be connected to the network, and also with one or more peripheral devices. The network apparatus is capable of controlling accesses to the one or more peripheral devices from terminals on the network. The network apparatus has a communicator, a detector, and an access controller. The communicator receives a reservation command and a sender identifier (ID) from one of the terminals on the network. The term "reservation command" as used herein refers to a command for requesting the network apparatus for an access right to a peripheral device that is not connected at that time, but is expected to be connected to the to the apparatus. The sender ID identifies the sender of the reservation command. The detector detects the peripheral device to be newly connected to the network apparatus. The access controller, when the detector has detected the newly connected peripheral device, conducts a process for rejecting accesses to the detected peripheral device requested by senders other than the sender identified by the received sender ID.

The network apparatus and the peripheral devices may be wire connected via connectors, or wirelessly connected by radio instead of the physical connectors for the wire connection. Examples of the detector may include device-recognition software with a plug-and-play function. Examples of the sender ID may include the IP address of each terminal that transmits the reservation command and the user ID and password inputted by the user of the terminal. In the case where the IP address is used, a "sender" would mean the terminal which transmitted the reservation command. In the case where the user ID or password is used, a "sender" would mean a user who inputted it.

On receiving a reservation command along with a sender ID, the network apparatus may give an exclusive access right of the peripheral device newly connected thereto, to the user identified by the received sender ID, even in a case where the peripheral device is unconnected to the network apparatus at the time of receiving the reservation command. The access right reservation to the unconnected peripheral device may thus be obtained without identifying the device on receiving the reservation command.

The technique disclosed in this specification can be implemented in computer program products. According to the network apparatus disclosed in the specification, users can reserve an access right to unconnected peripheral device by way of a terminal on a network.

DETAILED DESCRIPTION OF THE INVENTION

First Embodiment

Several non-limiting embodiments of the present invention will be described below with reference to the drawings. A network apparatus according to a first embodiment is a server 2 which can connect to a network, and, to which peripheral devices can be connected. The server 2 controls access to one of the connected peripheral devices requested from one of the terminals on the network. The server 2 is able to control a plurality of such access; in this sense, the server 2 controls accesses to the connected peripheral devices requested from the terminals on the network.

Figure 1:
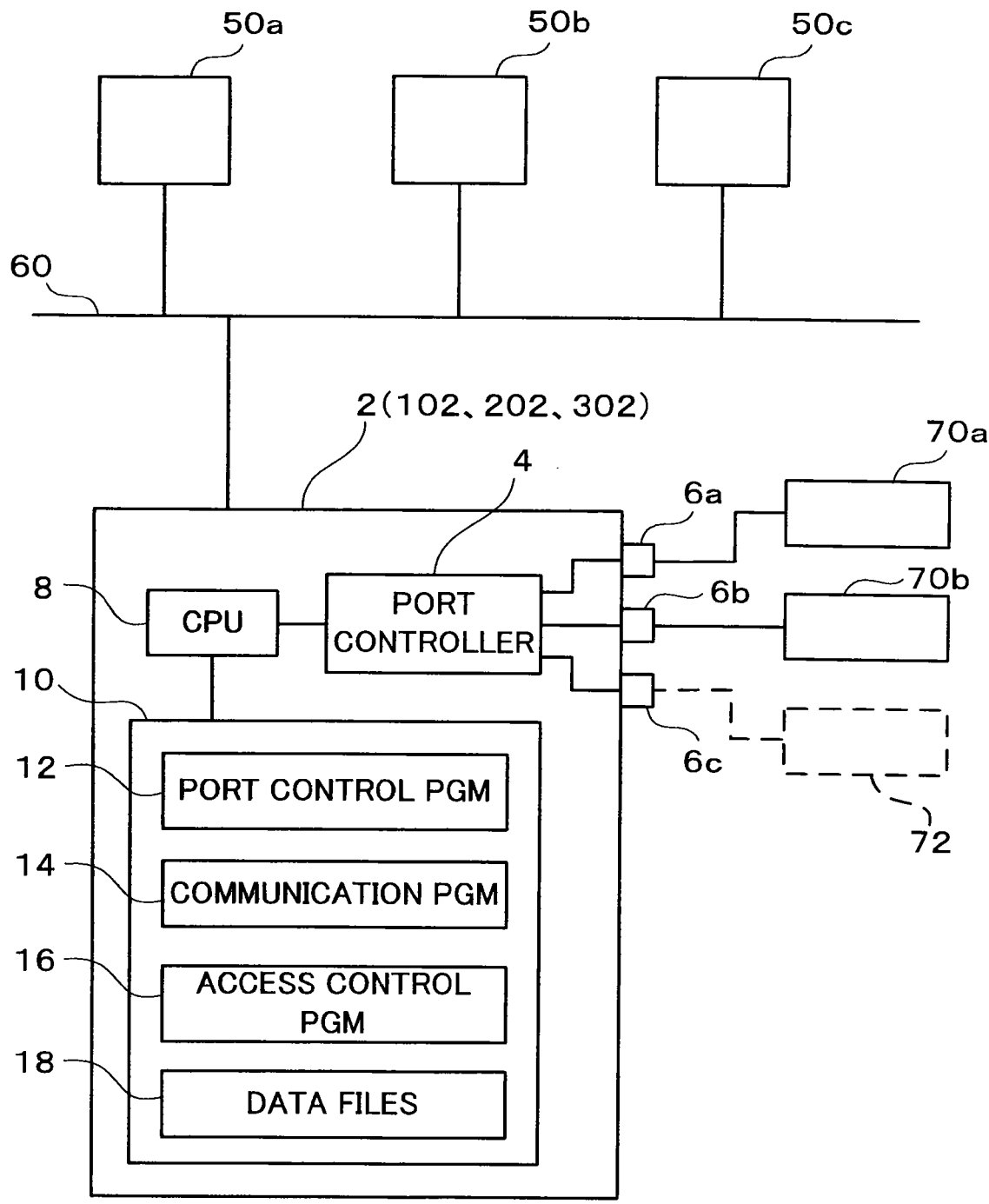
FIG. 1 is a block diagram of a server (network apparatus).

FIG. 1 shows a block diagram of the sever 2. The block diagram of FIG. 1 will also be referred to in the other embodiments described hereinafter. Servers according to the embodiments other than the first embodiment are identical with the server 2 in configuration, but differ in the process carried out thereof. To draw distinctions among the servers according to the individual embodiments, the server according to the second embodiment is referred to as "server 102", the server according to the third embodiment "server 202", and the server according to the fourth embodiment "server 302."

The server 2 is connected to a network 60. Plurality of terminals 50a, 50b, and 50c are also connected to the network 60. Each of the terminals 50a, 50b, and 50c is operated by individual users. The server 2 has plural ports 6a, 6b, and 6c for connecting peripheral devices to itself. The ports 6a, 6b, and 6c are connectors to which the cables of the peripheral devices are detachably connected. FIG. 1 shows a state in which the peripheral device 70a is connected to the port 6a, and the peripheral device 70b is connected to the port 6b. In addition, the peripheral device 72 indicated by a broken line indicates peripheral device that is not yet connected in the state as shown in FIG. 1. The peripheral devices 70a, 70b, and 72 are a printer, an imaging device, a large capacity storage, and the like. Hereinafter, plural devices of the same kind with same reference numerals and different alphabets may be collectively described only with the reference numerals. For example, the ports 6a, 6b, and 6c may be collectively described simply as "ports 6" by deleting the English small letters.

The user can use the peripheral devices 70 by manipulating the terminals 50. That is, the user can access the peripheral devices 70 from the terminals 50 via the network 60 and the server 2. The peripheral devices 70 are each capable of communicating with only one of the terminals at era time. Therefore, the server 2 controls the accesses to the peripheral devices 70 requested from the terminals 50.

The terminals 50 are each capable of requesting the server 2 for a reservation of an exclusive access right to the peripheral device 72 not yet connected to the server 2. The server 2 accepts from one of the terminals 50 a reservation command for requesting the reservation of the access right to the peripheral device 72 not yet connected to the server 2. The server 2 allows the user of the terminal 50 to reserve the access right to the peripheral device 72 to be newly connected to the server 2. The user of the terminal 50 can reserve the peripheral device 72 before actually connecting it to the server 2 without identifying the device 72 at the time of requesting the reservation.

The server 2 has a CPU 8, a port controller 4, and a storage 10. The CPU 8 conducts various processes based on various programs memorized in the storage 10. The port controller 4 communicates with each of the peripheral devices 70 (and 72 when connected) connected to the respective ports 6a, 6b, and 6c on a one-to-one basis. The port controller 4 is also connected to the CPU 8, and is controlled by the CPU 8. It may be said that, the CPU 8 is connected with the peripheral devices 70 (and 72 when connected) via the port controller 4.

The storage 10 holds a port control program 12, a communication program 14, an access control program 16, and a data file 18. As for reference, the term "PGM" shown in FIG. 1 is an abbreviation for "program". The data file 18 is a file to which data received from the terminals 50 and data on the connected peripheral devices 70 are stored.

Now the features of the programs held in the storage 10 will be described. The port control program 12 describes a process for controlling the port controller 4 and a process for controlling communication between the CPU 8 (i.e., the server 2) and the peripheral devices connected to the server 2. Further, the port control program 12 detects the peripheral device 72 when it has been newly connected to one of the port 6. The peripheral devices 70 and 72 each hold a device ID (a peripheral device ID) for identifying themselves. Further, the port control program 12 describes a process for acquiring a device ID from the peripheral device in a case where a newly established connection is detected. For example, in the case where the unconnected peripheral device 72 has been newly connected to the port 6c, the server 2 acquires from the newly connected peripheral device 72 its device ID held in the device 72. The device IDs acquired from the peripheral devices are written to the data file 18.

In the communication program 14 describes a process for controlling communication between the server 2 and the terminals 50 via the network 60. And further, the communication program 14 describes a process for receiving data such as commands from the terminals 50 and transmitting data such as messages from the server 2 to the terminals 50. The data (commands or the like) received are written to the data file 18.

Commands described in this embodiment are reservation command, connect command, and disconnect command. The reservation command is a command requesting the server 2 for an access right reservation to the peripheral device 72 not yet connected to the server 2 at the time of requesting the reservation. The connect command is a command requesting the server 2 to establish communication with one of the peripheral devices 70 connected to the server 2 (and to establish communications with the peripheral device 72, after the device 72 have been newly connected thereto). The acceptance of the connect command by the server 2 allows the terminal 50 to access the designated peripheral device. Therefore, in a case where the server 2 does not establish a connection between the given terminal and the designated peripheral device despite the issuance of the connect command from the given terminal means that the server 2 rejects the access to the peripheral device requested from the terminal.

When transmitting the reservation command, the terminal 50 transmits, along with the commands, user ID (sender ID) for identifying the sender (user) of the command. Incidentally, the user IDs used in this embodiment are the IP addresses of the respective terminals 50 that transmits the commands (the terminals 50 manipulated by the users). As an alternative, the user IDs may be passwords or the like that are inputted to the terminals 50 by the users.

The disconnect command is a command requesting the server 2 to disconnect communication established between the terminal 50 and the peripheral device 70 (and 72). When transmitting the disconnect command, the terminal 50 transmits, along with the command, the user ID and the device ID (peripheral device ID) which identifies the peripheral device to be disconnected. As described above, when the unconnected peripheral device 72 has been connected to the port 6 with the process executed by the port control program 12, a device ID is acquired from the newly connected peripheral device 72. The device ID acquired by the port control program 12 is transmitted to the terminal 50 that reserves and/or makes connection to the peripheral device 72. Therefore, when transmitting a disconnect command, each of the terminals 50 can transmit the device ID along with the command. Likewise, when transmitting a connect command, the terminal 50 transmits, along with the command, the user ID and the device ID for identifying the peripheral device the terminal 50 desires to be connected to.

The followings are examples of messages transmitted to the terminals 50 by the server 2.

OK_RESERVED (a message indicating a reservation has been established)

NG_O_RESERVED (a message indicating a reservation establishment failure (due to the reservation that has been established for other terminals, and the like))

OK_CONNECTED (a message indicating a connection has been established)

OK_DISCONNECTED (a message indicating a disconnection has been succeeded)

NG_O_CONNECTED (a message indicating a connection to the identified peripheral device is already established by other terminals)

NG_NOT_CONNECTED (a message indicating the identified peripheral device is not connected to the port)

The access control program 16 describes a process for controlling accesses as requested from the terminal 50 to one of the peripheral devices 70 (and 72). That is, the server 2 determines whether to permit or reject communication between the particular terminal 50 and the peripheral device 70 (and 72) by utilizing the access control program 16. The server 2, having received a reservation command from the terminal 50 (identified by the user ID), sets an exclusive access right to the peripheral device 72 that will be newly connected to the server 2 after receiving the reservation command, to the terminal 50 which requested the reservation. In other words, once accepting a reservation command, the server 2 does not establish communication between the other terminals and the peripheral device 72 that will be newly connected to the server 2 following the reservation command; after receiving the reservation command, the server 2 rejects terminals other than the given terminal that requested the reservation to make access to the peripheral device 72 that will be newly connected.

Figure 2:
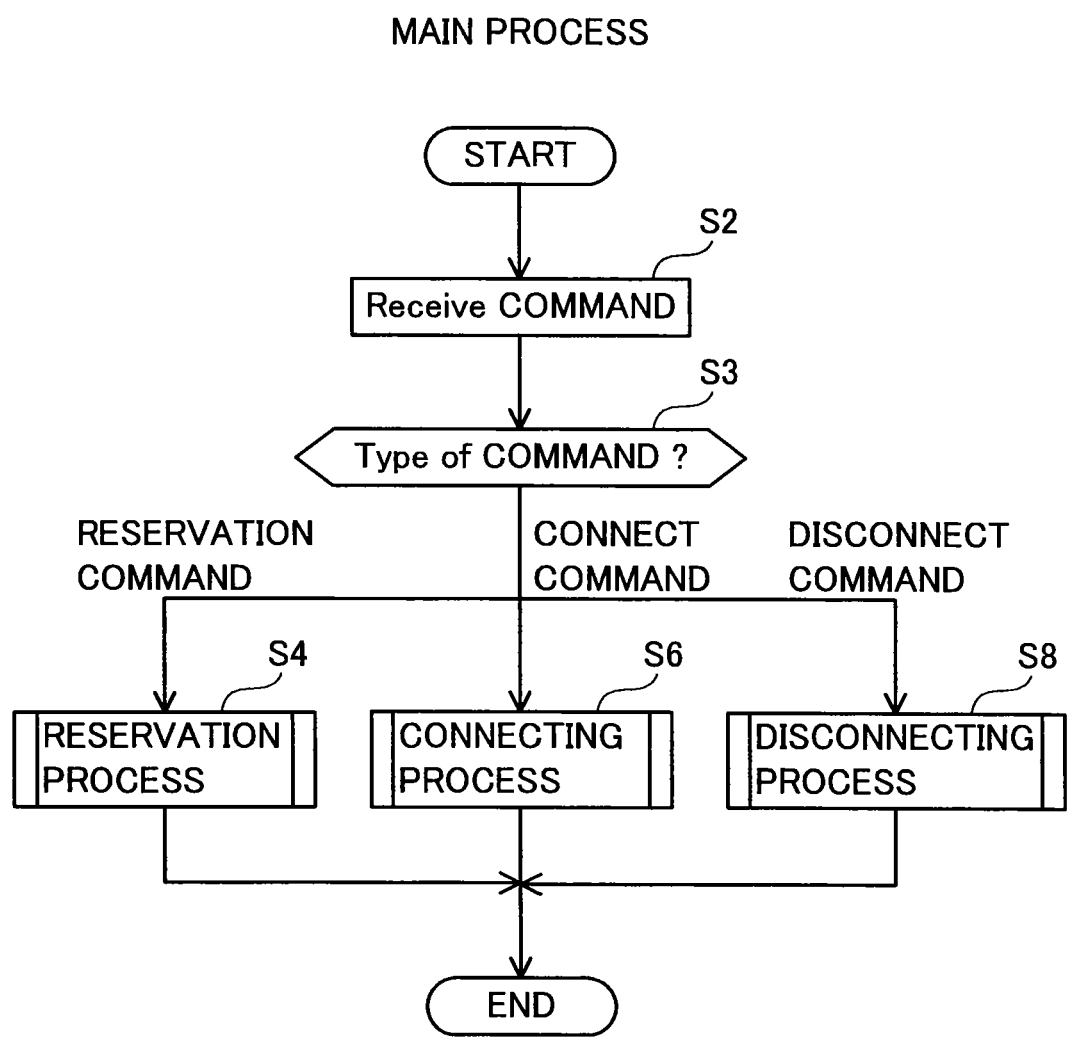
FIG. 2 is a flowchart of a main process conducted by the server.

Processes conducted by the server 2 will be described below. First, a main process of the server 2 regarding receipt of commands from terminals 50 will be described. FIG. 2 is a flowchart of the main process conducted by the server 2. The process represented in the flowchart is described in the communication program 14. The server 2, on receiving a command from one of the terminals 50 (Step S2), analyzes the command and starts a process in accordance with the type of the command: a reservation process, connecting process, or disconnecting process (Steps S3 to S8). The reservation process (Step S4), connecting process (Step S6), and disconnecting process (Step S8) shown in FIG. 2 will be described in detail below. These processes are described in the access control program 16. Hereinafter, the object to be reserved is the unconnected peripheral device 72 in FIG. 1.

Figure 3:
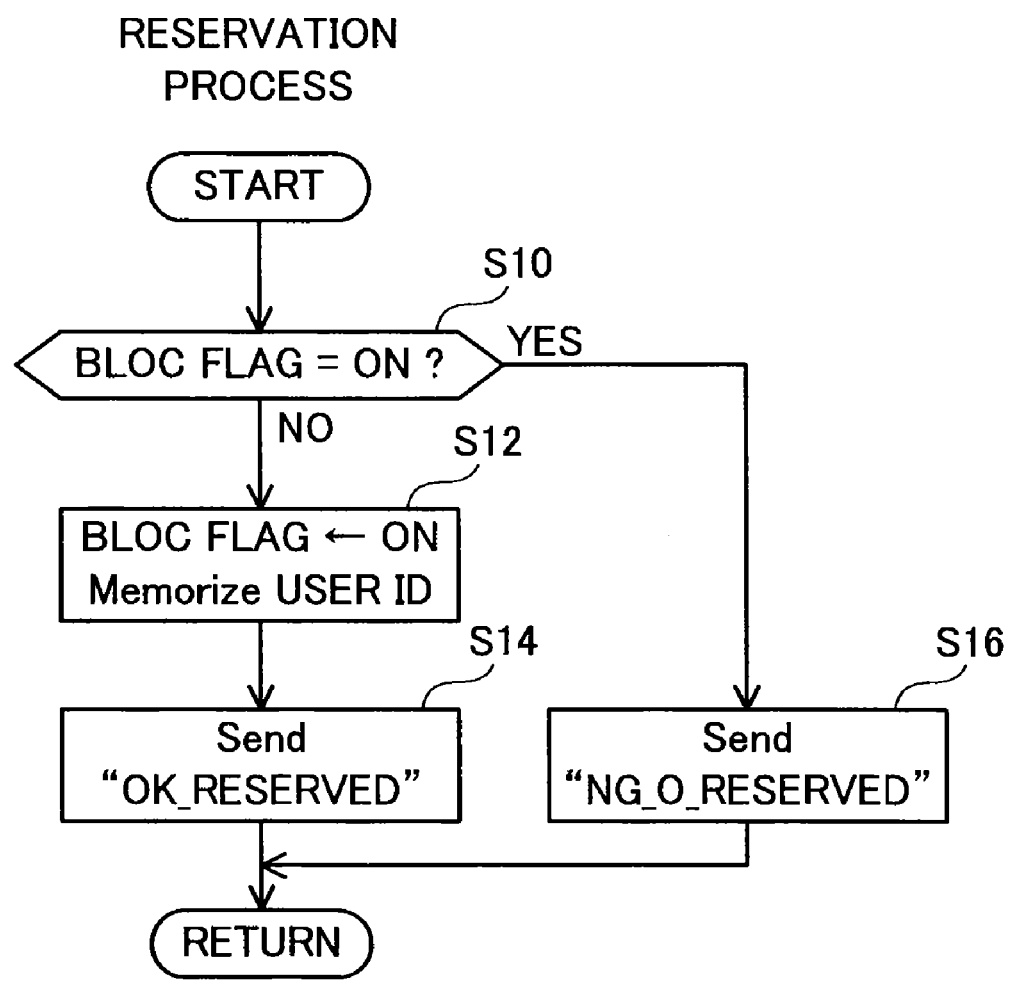
FIG. 3 is a flowchart of a reservation process conducted by the server.

FIG. 3 is a flowchart showing the reservation process. In this process, whether "BLOC FLAG" is ON or not is initially checked (Step S10). "BLOC FLAG" refers to a flag which is defined in the program and which indicates whether a reservation is already established or not. "BLOC FLAG" is set in "ON" state or "OFF" state according to a predetermined process that is described later. The "ON" state indicates that a reservation is already established; while the "OFF" state indicates that a reservation is not established.

When "BLOC FLAG" is "ON" (YES in Step S10), that is, when the reservation command has already been accepted and the reservation has been established, "NG_O_RESERVED" message (the message indicating that a reservation for one of the other terminals is established) is transmitted to the terminal 50 that had issued the reservation command, in order to notify the reservation command therefrom has not been accepted (Step S16). When "BLOC FLAG" is "OFF" (NO in Step S10), that is, when the reservation is not yet established, "BLOC FLAG" is set "ON" state and the user ID received along with the reservation command is memorized in the data file 18 (Step S12). Then, "OK_RESERVED" message (the message indicating that the reservation has been successfully established) is transmitted to the terminal identified by the user ID (Step S14). In the process conducted in Step S12, "BLOC FLAG" is set "ON" state. Hence the server 2 will not accept any other reservation commands until "BLOC FLAG" has been set "OFF" state.

After the reservation for the unconnected peripheral device 72 has been established, the user physically connects the peripheral device 72 to the port 6 of the server 2. Therefore, the peripheral device 72 hereinafter enters a state where it is newly connected to the server. When the peripheral device 72 has been newly connected to the server 2, the server 2 acquires the device ID from the device 72, and then transmits the acquired device ID to the terminal 50 that had made the reservation. The server 2 sends the device ID that is most recently acquired after the establishment of the reservation. The terminal 50 that had made the reservation can thus proceed to the process of making connection to the peripheral device of the given device ID. Furthermore, in non-limiting alternative embodiment, the device ID acquired in the above process may be sent to all of the terminals 50 on the network 60.

Figure 4:
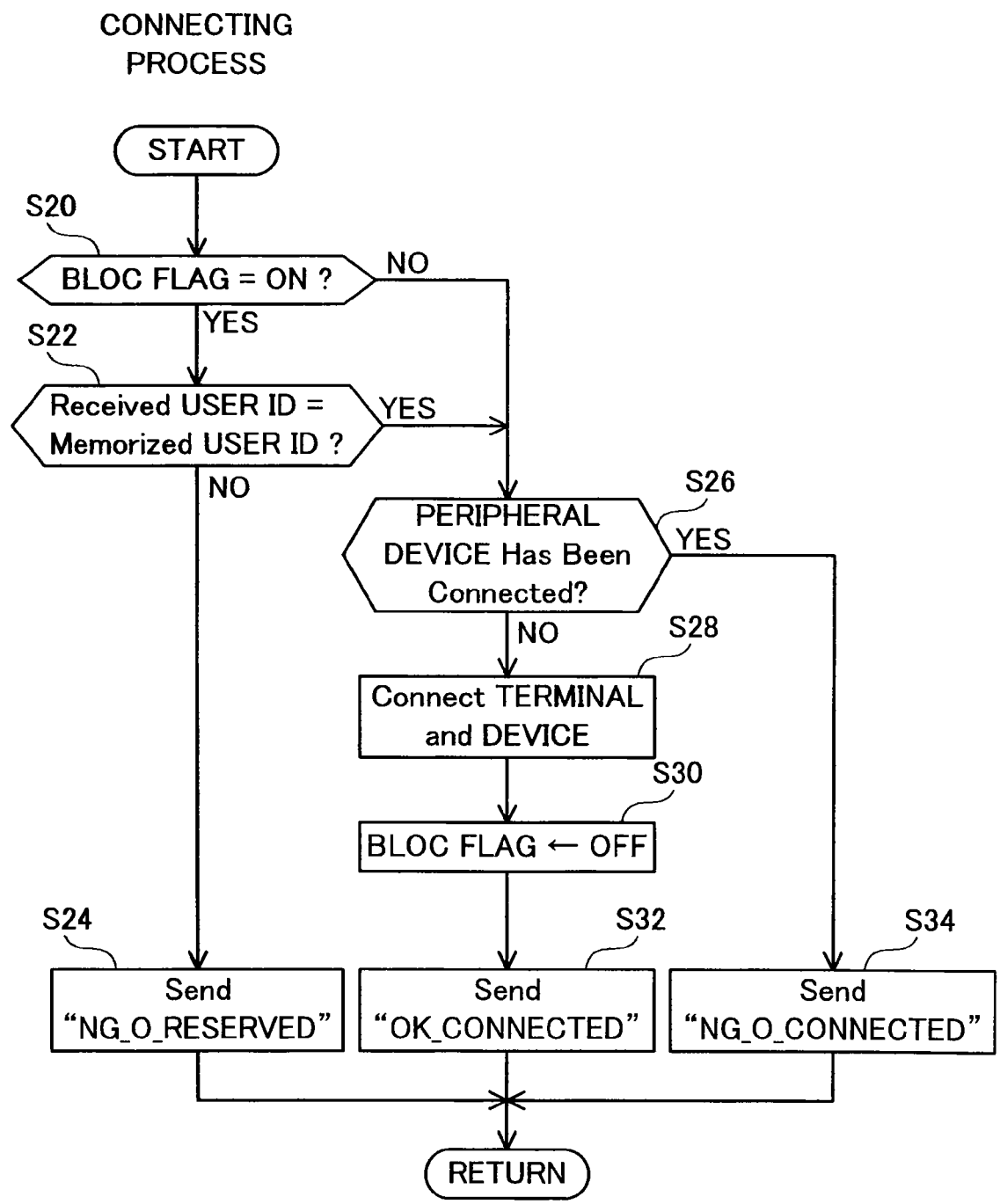
FIG. 4 is a flowchart of a connecting process conducted by the server.

FIG. 4 shows a flowchart of the connecting process. As described before, the server 2 receives, along with the connect command, the device ID which identifies the peripheral device to be connected and the user ID which identifies the terminal 50 that transmitted the connect command. In the connecting process, the server 2 initially checks whether "BLOC FLAG" is "ON" or not (Step S20). As described before, in a case where "BLOC FLAG" is "ON", this indicates that a reservation has already been established. On the other hand, in a case where "BLOC FLAG" is "OFF", this indicates that a reservation is not established.

When "BLOC FLAG" is "ON" (YES in Step S20), the server 2 checks whether the user ID received along with the connect command and the user ID memorized in Step S12 (the user ID received along with the reservation command; see FIG. 3) are identical or not (Step S22). When they are not identical (Step S22: NO), it indicates that the terminal which transmitted the connect command and the terminal which transmitted the reservation command are different. Hence, the server 2 terminates the process without connecting the terminal that had transmitted the connect command to the peripheral device identified by the device ID. That is, the server 2 rejects users other than the user who transmitted the reservation command to make access to the identified peripheral device. In this case, in Step S24, the server 2 transmits an "NG_O_RESERVED" message (the message indicating that one of the other users has already established a reservation) to the terminal which transmitted the connect command (the terminal identified by the received user ID).

In the case where the user ID received along with the connect command and the user ID memorized in Step S12 are identical (YES in Step S22), it means that the same terminal transmitted the reservation command and the connect command. In this case, the server 2 executes Step S26. The server 2 attempts to connect the terminal identified by the received user ID and the peripheral device identified by the received device ID. That is, the server 2 checks whether or not the peripheral device identified by the received device ID has already been connected (Step S26). In this step, the server 2 checks whether or not communication between the identified peripheral device and one of the other terminals has already been established. When no connection has been established for the identified peripheral device (Step S26: NO), the server 2 connects the terminal identified by the received user ID and the peripheral device identified by the received device ID (Step S28). Then, the server 2 sets "OFF" state to "BLOC FLAG" (Step S30), and transmits an "OK_CONNECTED" message (the message indicating that the connection has been successfully established) to the identified terminal 50 (Step S32). In the series of process described above, Step S28 allows the terminal which transmits the connect command to access the peripheral device. Further, Step S30 allows the server 2 to accept new reservation command. On the other hand, when the identified peripheral device has already been connected with one of the other terminals (Step S26: YES), the server 2 transmits an "NG_O_CONNECTED" message (the message indicating that one of the other terminals has been connected to the identified peripheral device) to the identified terminal (Step S34).

Note that, a case where the "YES" determination is made at Step S26 executed after Step S22 occurs when the peripheral device identified by the device ID received along with the connect command has been connected with one of the other terminals before the reception of the reservation command (that is, before the reservation command is received in Step S2 of FIG. 2). Such condition may arise, for example, in a case where after the user (the terminal which transmitted the reservation command) transmitted the reservation command with the device ID designating the peripheral device to be connected, the user transmits the connect command with incorrect device ID (as of not being the same device ID transmitted with the reservation command, but indicates the peripheral device which had already been connected at the time of the transmission of the reservation command). Therefore, when the "YES" determination has been made in Step S26 executed after Step S22, the server 2 terminates the process without setting "BLOC FLAG" to the "OFF" state. The state in which the reservation is established (the setting of "BLOC FLAG" is maintained at the "ON" state) is thus maintained. In the aforementioned practice, the reservation will not be canceled even when the server 2 receives the connect command with the incorrect device ID.

The case of "BLOC FLAG" being "OFF" (Step S20: NO) refers to a case where the process shown in FIG. 3 is not conducted; that is, the reservation for the unconnected peripheral device 72 is not established. In this case, the server 2 executes Step S26. That is, the server 2 attempts to connect the terminal identified by the received user ID to the peripheral device identified by the received device ID. For the details of Step S26, aforesaid explanations should be referred to.

Figure 5:
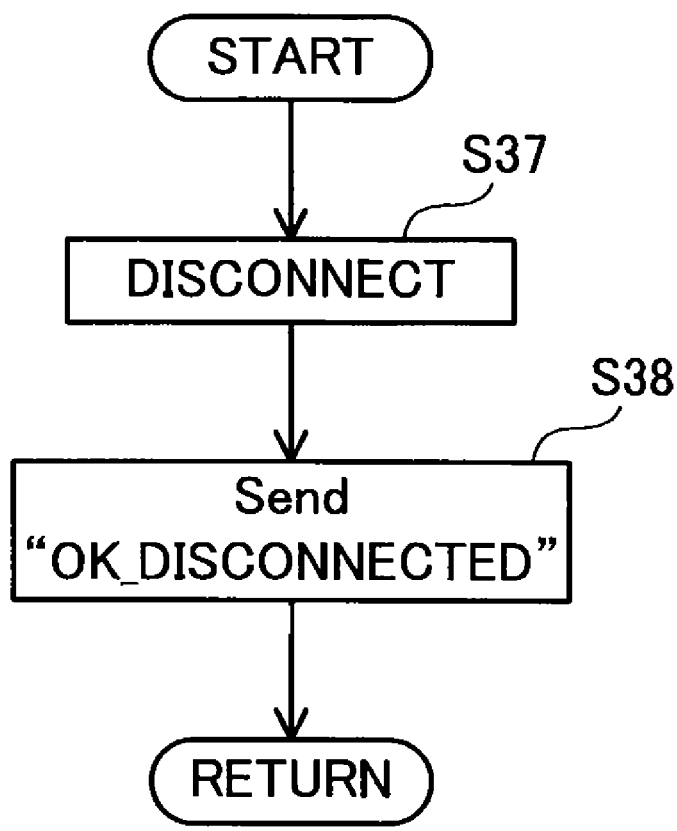
FIG. 5 is a flowchart of a disconnecting process conducted by the server.

FIG. 5 shows a flowchart of the disconnecting process. As has been described, the terminal transmits the disconnect command with the user ID and the device ID for identifying the peripheral device to disconnect. In Step S37, the server 2 disconnects communication between the peripheral device identified by the device ID received with the disconnect command and the terminal which transmitted the disconnect command (the terminal identified by the received user ID). Then, the server 2 transmits an "OK_DISCONNECTED" message (the message indicating that the disconnection has been succeeded) to the identified terminal (Step S38).

The server 2, receiving the reservation command from one of the terminal 50, memorizes the user ID of the terminal which transmitted the reservation command, and sets "ON" state to "BLOC FLAG" (Step S12 of FIG. 3). Once "ON" state is set to "BLOC FLAG", the server 2 rejects any reservation commands and connect commands for the identified peripheral device from the other terminals until a connect command is transmitted from the terminal which transmitted the reservation command (Step S20 and S22 of FIG. 4). In contrast, when a connect command is transmitted from the identified terminal that had transmitted the reservation command, the server 2 connects the identified terminal to the reserved peripheral device (Steps S22 and S28). The above process does not require the device ID of the identified peripheral device to be transmitted when making the reservation. An access right to the designated peripheral device can be reserved even when the device ID of the designated peripheral device, not connected at the time of making the reservation, is unknown.

Second Embodiment

Next, the server 102 (network apparatus) according to the second embodiment will be described. The server 102 has the same configuration as the server represented in the block diagram of FIG. 1, and therefore the explanation of the configuration of server 102 will be omitted. As for the devices and programs provided for the server 102, the reference numerals in the block diagram of FIG. 1 will be used.

The server 102 according to the second embodiment and the server 2 according to the first embodiment differ in the conducting processes. As it was with the server 2, the server 102 is capable of reserving an access right to the peripheral device that is to be newly connected to the server 2 at a time after the reservation, without identifying the device. Furthermore, the server 102 is also capable of reserving an access right to the peripheral device that is to be newly connected thereto, by identifying the device. The server 102 can accept a reservation command accompanying both the user ID and the device ID, and also a reservation command accompanying only the user ID. Hereinafter, the reservation command accompanying both the user ID and the device ID may be referred to as "first reservation command". The reservation command accompanying only the user ID may be referred to as "second reservation command". The main process conducted by the server 102 is the same as that shown in FIG. 2. Furthermore, the disconnecting process conducted by the server 102 is the same as that shown in FIG. 5. For the details of the main process and/or the disconnecting process, aforesaid explanations should be referred to. A. The server 102 is different from the server 2 of the first embodiment in the reservation process and connecting process.

Figure 6:
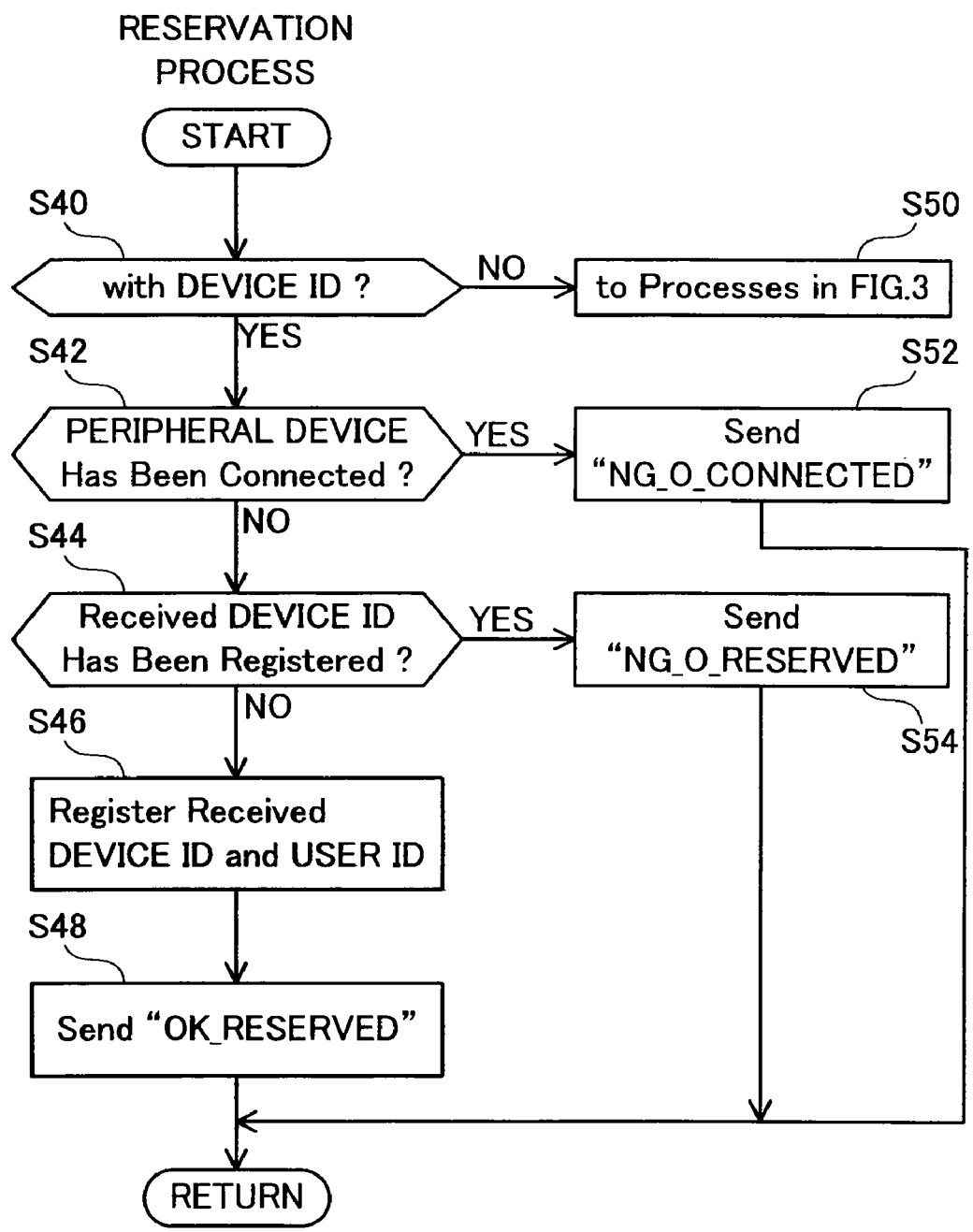
FIG. 6 is a flowchart of a reservation process conducted by a server according to a second embodiment.

Now the reservation process conducted by the server 102 will be described. FIG. 6 shows a flowchart of the reservation process conducted by the server 102. In the reservation process, the server 102 initially checks whether or not the device ID is accompanied by the reservation command (Step S40). When the device ID is not accompanied by the reservation command (Step S40: NO), the server 102 jumps to the processes represented in the flowchart of FIG. 3 (Step S50). That is, when the server 102 receives the second reservation command, the server 102 conducts the same processes as described in the first embodiment.

In a case where the device ID is included with the reservation command, that is, when the server 102 receives the first reservation command (Step S40: YES), the server 102 checks whether or not the peripheral device identified by the device ID accompanied by the first reservation command has already been connected to the server 102, and also whether or not the device has already been connected with one of the other terminals (Step S42). When the identified peripheral has already been connected with one of the other terminals (Step S42: YES), the reservation thereof cannot be made. Therefore, in this case, the server 102 transmits an "NG_O_CONNECTED" message (the message indicating that one of the other terminals has already connected to the identified device) to the terminal that had transmitted the reservation command (the terminal identified by the user ID; Step S52). In contrast, when the identified peripheral device is not connected with any of the other terminals (Step S42: NO), the server 102 checks whether or not the received device ID has already been registered in the reservation list (Step S44). The reservation list refers to the data file 18 stored in the storage of the server 102 (i.e. the storage 10 of FIG. 1). The reservation list is a data file in which the user ID accompanied by the reservation command and the device ID are associated with each other. The reservation list may include a plurality of such association of user ID and device ID.

When the received device ID is not registered in the reservation list (Step S44: NO), the server 102 associates the user ID attached to the received reservation command with the device ID, and registers the user ID and its corresponding device ID in the reservation list (Step S46). By registering the user ID and device ID associated with each other in the reservation list, the reservation for the designated peripheral device (the peripheral device identified by the device ID) is established. Thereafter, the server 102 transmits, to the terminal identified by the user ID, an "OK_RESERVED" message (the message indicating that the reservation has been established) (Step S48). In contrast, when the received device ID has already been registered in the reservation list (Step S44: YES), the server 102 transmits, to the terminal identified by the user ID, an "NG_O_RESERVED" message (the message indicating that one of the other terminals has already established a reservation) because the peripheral device identified by the received device ID has already been reserved by one of the other terminals (Step S54), and the request of reservation has been rejected.

Figure 7:
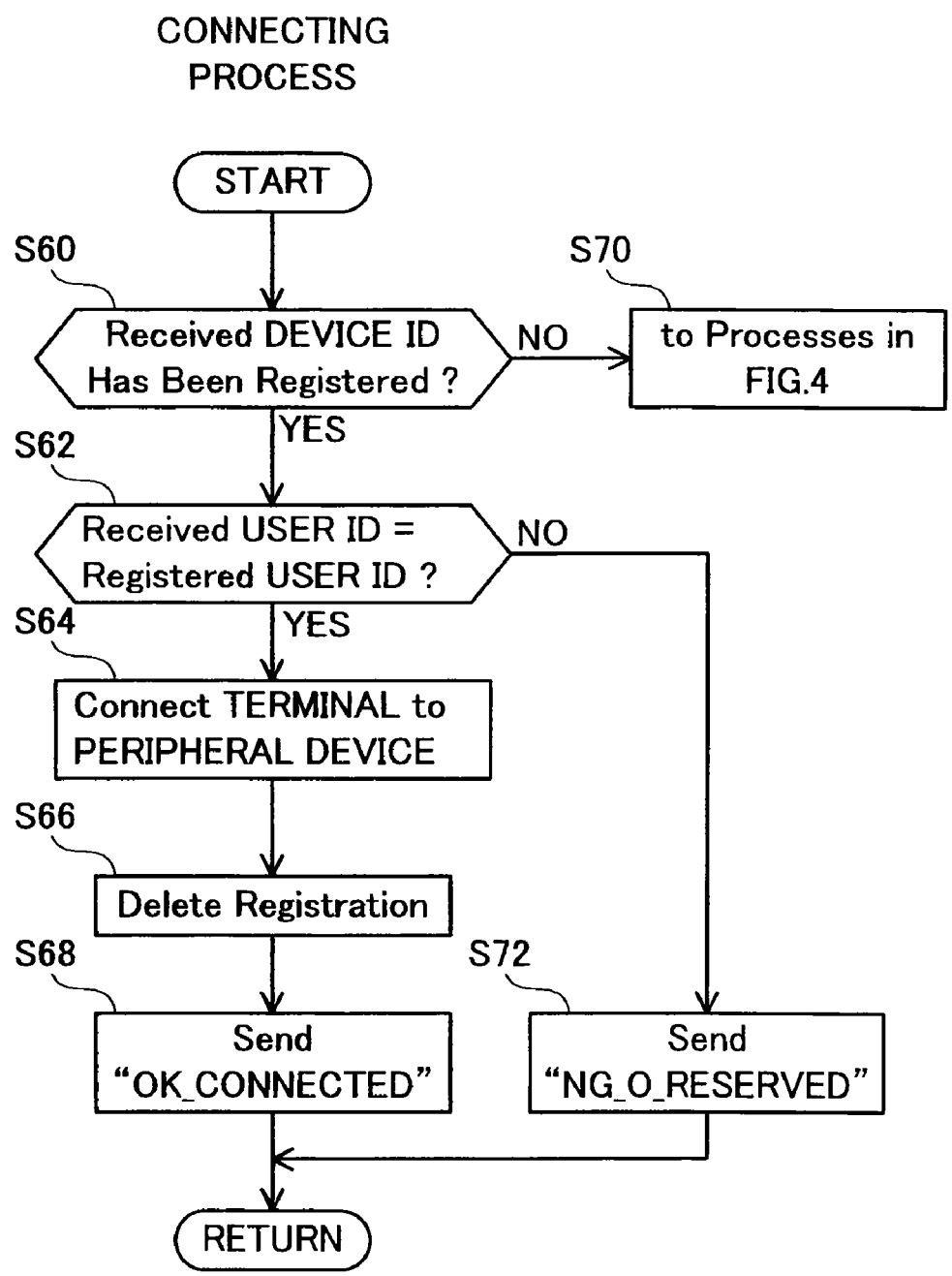
FIG. 7 is a flowchart of a connecting process conducted by the server according to the second embodiment.

Next, the connecting process conducted by the server 102 will be described. FIG. 7 shows a flowchart of the connecting process conducted by the server 102. As has been described, the server 102 receives, along with the connect command, the user ID for identifying the terminal which transmitted the connect command, and the device ID for identifying the peripheral device to be connected.

The server 102 checks whether or not the received device ID is registered in the registration list (Step S60). In a case where the received device ID is not registered in the registration list, it indicates that a reservation command accompanying the device ID has not been accepted prior to the receipt of the connect command. In such a case, a peripheral device identified by the device ID, though not registered in the registration list, may be a target of reservation command without device ID (the second reservation command). Therefore, when a "NO" determination has been made in Step S60, the server 102 proceeds to the process as represented in the flowchart of FIG. 4, to cope with the second reservation commands (Step S70).

A "YES" determination in Step S60 indicates that the access to the peripheral device identified by the received device ID has already been reserved. In this case, the server 102 extracts, from the registration list, the registered user ID associated with the received device ID. The terminal identified by the extracted user ID is the terminal which had requested the server 102 for reservation of the peripheral device identified by the registered device ID. Then, the server 102 checks whether or not the user ID received along with the connect command is identical with the registered user ID (Step S62). In a case where they are not identical (Step S62: NO), this indicates that the peripheral device identified by the registered device ID is not the peripheral device reserved by the terminal that has transmitted the connect command (the terminal identified by the user ID received along with the connect command) for its access reservation. In this case, the server 102 transmits an "NG_O_RESERVED" message (the message indicating that one of the other terminals has already established a reservation; Step S72), and terminates the process.

A "YES" determination at Step S62 indicates that the peripheral device identified by the registered device ID has been reserved by the same terminal which has transmitted the connect command (the terminal identified by the user ID received along with the connect command). In this case, the server 102 connects the terminal identified by the received user ID and the peripheral device identified by the registered device ID (Step S64). The server 102 establishes communication between the identified terminal and the identified peripheral device. The establishment of the communication allows the terminal identified by the received user ID to access the connected peripheral device. The server 102 then deregisters the received user ID and the device ID from the registration list (Step S66), and transmits to the identified terminal an "OK_CONNECTED" message (the message indicating a successful establishment of the connection; Step S68), and terminates the process. By deregistering (deleting) the received user ID and the device ID, the peripheral device identified by that device ID can be reserved again after the termination of the connecting process. The server 102 (network apparatus) according to the second embodiment can simultaneously accept a reservation command (first reservation command) in which the peripheral device to be reserved is specifically identified and a reservation command (second reservation command) in which the peripheral device is not identified. In the above embodiment, a plurality of reservations may be established simultaneously in processes that are executed in parallel, on condition that the received device IDs are different.

THIRD EMBODIMENT

Next, the server 202 (network apparatus) according to the third embodiment will be described below. The server 202 has the same configuration as the server shown in the block diagram of FIG. 1, and therefore the explanation of configuration will be omitted. As for the devices and programs provided for the server 202, the reference numerals in the block diagram of FIG. 1 will be used.

The server 202 of the third embodiment and the server 2 of the first embodiment differ in the conducting processes. As it was with the server 2, the server 202 can reserve an access right to a peripheral device to be newly connected therewithout identifying the peripheral device when making the reservation. Furthermore, the server 202 can reserve an access right to a peripheral device that belongs to an identified category of a peripheral device that will be newly connected therewith. In this case, "category" refers to data used to classify the peripheral devices by their function. The data indicating the category is memorized in the individual peripheral devices in advance. For example, in USB standards, as categories (also referred to as "classes" in USB standards), such as audio, mass storage, printing, and imaging are specified. The categories are also memorized in the terminals 50 in advance.

When a peripheral device has been newly connected to the port 6, the server 202 acquires, from the connected peripheral device, a category ID for identifying the category of the device. The server 202 memorizes the acquired category ID. The server 202 can accept a reservation command to which only the user ID is attached, and also a reservation command to which both user ID and category ID for identifying the category of the peripheral device to be reserved are attached. The main process conducted by the server 202 is shown in FIG. 2. Furthermore, the disconnecting process conducted by the server 202 is shown in FIG. 5. For the details of the main process and/or the disconnecting process, aforesaid explanations should be referred to. The server 202 is different from the server 2 of the first embodiment in the reservation process and connecting process.

Figure 8:
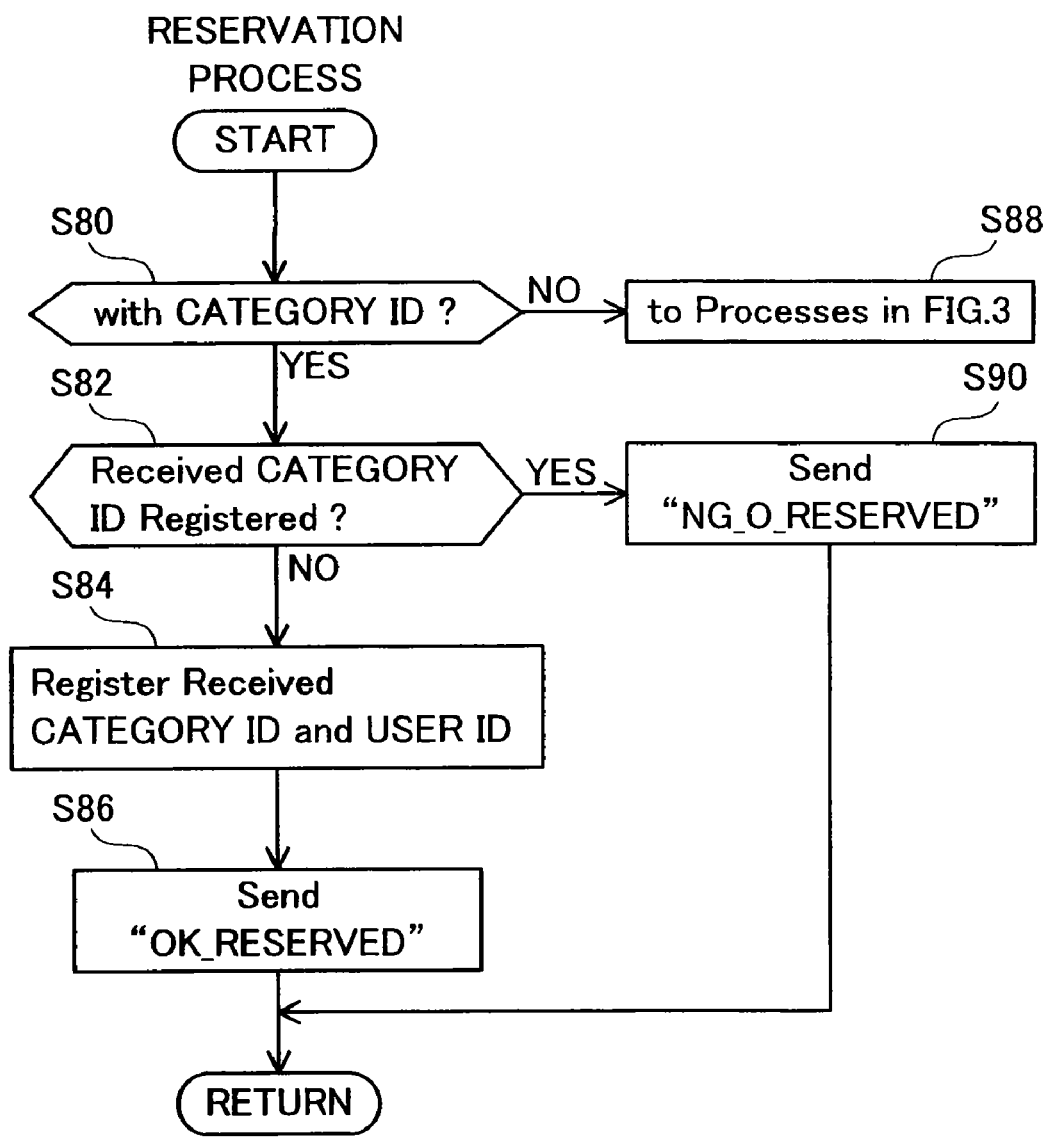
FIG. 8 is a flowchart of a reservation process conducted by a server according to a third embodiment.

The reservation process executed by the server 202 will be described below. FIG. 8 shows a flowchart of the reservation process of the server 202. The server 202 initially checks whether or not a category ID is attached to the received reservation command (Step S80). When the category ID is not attached (Step S80: NO), the server 202 jumps to the process of the flowchart of FIG. 3 (Step S88); that is, when the category ID is not attached to the reservation command, the same process as in the first embodiment is conducted. In contrast, when the category ID is attached to the reservation command (Step S80: YES), the server 202 checks whether or not the received category ID has already been registered in the reservation list (Step S82). Unlike the registration list according to the second embodiment, the registration list according to this embodiment is a data file in which one or more sets of the user ID received along with reservation command and the category ID are associated with each other.

When the received category ID is not registered in the reservation list (Step S82: NO), the server 202 associates the user ID attached to the received reservation command with the category ID, and registers them in the reservation list (Step S84). With the operation of associating the user ID with the category ID and registering them in the reservation list, the reservation of the peripheral device (the peripheral device belonging to the category identified by the category ID) is established by the server 202. Thereafter, in Step S86, the server 202 transmits to the terminal identified by the user ID an "OK_RESERVED" message (the message indicating that the reservation has been successfully established).

When the received category ID has already been registered in the reservation list (YES in Step S82), it indicates a state in which the reservation of the peripheral device that belongs to the category identified by the received category ID has already been established by one of the other terminals, and further reservation of the peripheral device belonging to the identified category cannot be made. Thus, in Step S90, the server 202 transmits, to the terminal identified by the user ID, an "NG_O_RESERVED" message (the message indicating that one of the other terminals has already established the reservation).

Figure 9:
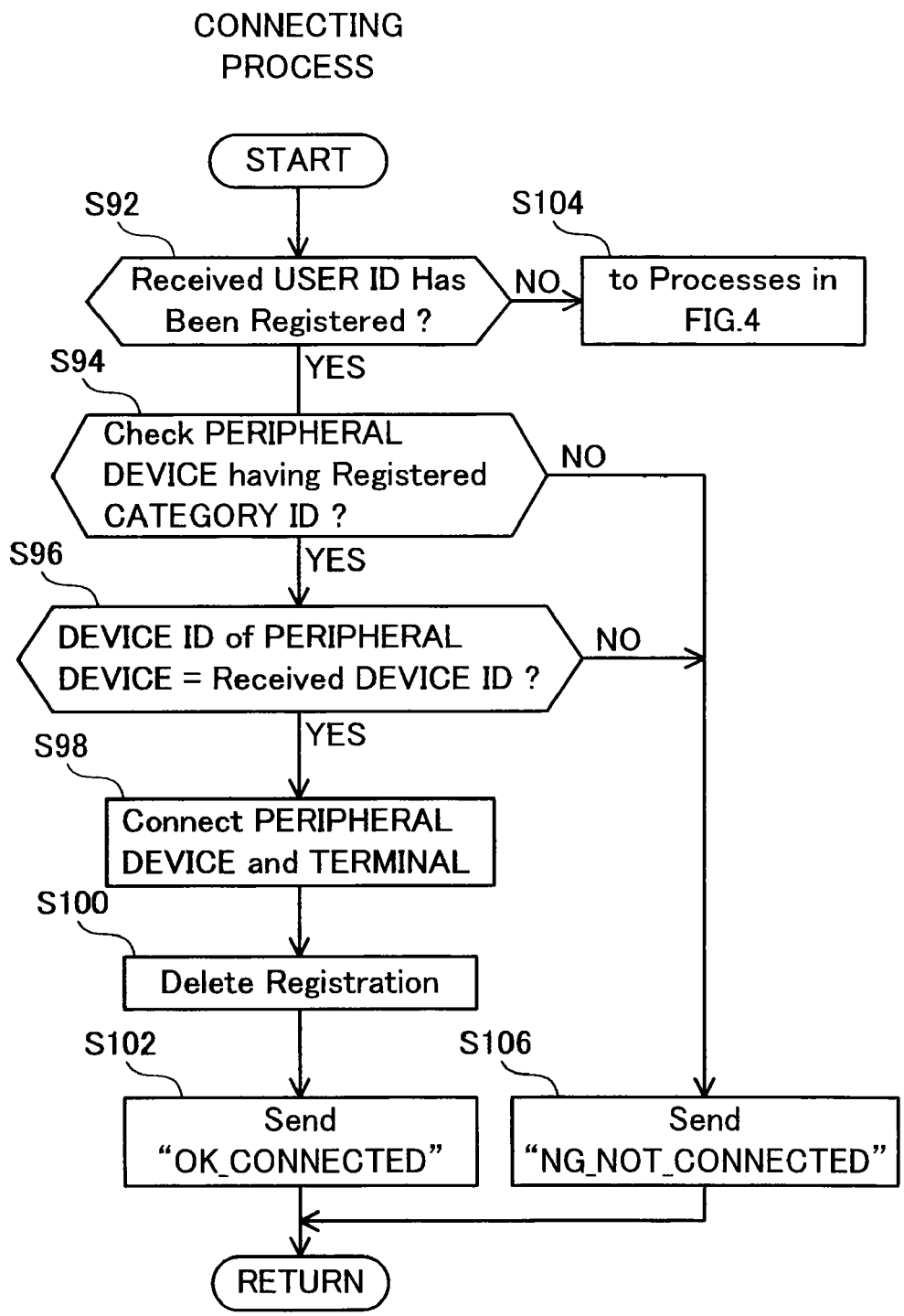
FIG. 9 is a flowchart of a connecting process conducted by the server according to the third embodiment.

Next, the connecting process by the server 202 will be described. FIG. 9 shows a flowchart of the connecting process executed by the server 202. As described before, the server 202 receives, along with the connect command, the user ID for identifying the terminal which transmitted the connect command and the device ID for identifying the peripheral device to connect to. Further, as described before, the server 202 acquires the device ID and category ID of the newly connected peripheral device when a newly established connection of the peripheral device to the port 6 is detected.

The server 202 checks whether or not the user ID received along with the connect command has been registered in the registration list (Step S92); that is, the server 202 checks whether or not the received user ID is identical with the user ID registered in Step S84 (see FIG. 8). In other words, the server 202 checks whether or not the terminal which transmitted the connect command (the terminal identified by the received user ID) is the same terminal that transmitted the reservation command with the designated category ID attached thereto.

"NO" determination at Step S92 indicates that the connect command may have been issued from the terminal which had transmitted the reservation command without designating the category ID. Therefore, when "NO" determination is made in Step S92, the server 202 proceeds to the process represented in the flowchart of FIG. 4, to cope with the reservation command issued without designating the category ID (Step S104).

When "YES" determination is made in Step S92, the server 202 identifies a category ID corresponding to the received user ID (the user ID registered in the registration list) with reference to the registration list. Then, the server 202 checks whether or not a peripheral device, excluding the peripheral device being connected with one of the other terminals and which having the same category ID as that identified (the registered category ID), is connected to the port 6 (Step S94). In other words, in Step S94, the server 202 checks whether or not a peripheral device having the same category ID as that registered is connected. "NO" determination in Step S94 indicates a state where the peripheral device to be connected therewith has not been connected to the port 6 at that point. In this case, in Step S106, the server 202 transmits an "NG_NOT_CONNECTED" message (the message indicating that the designated peripheral device is not connected to the port) and terminates the process.

On the other hand, in a case where "YES" determination is made in Step S94, the server 202 checks whether or not the device ID of the peripheral device whose presence has been confirmed in Step S94 is identical with the device ID received along with the connect command (Step S96). "NO" determination in Step S96 indicates a state where the peripheral device to be connected therewith has not been connected to the port 6 at that point. In this case, the server 202 proceeds to Step S106, and transmits an "NG_NOT_CONNECTED" message (the message indicating that the designated peripheral device is not connected to the port), and terminates the process.

"YES" determination in Step S96 indicates a case where the terminal which transmitted the connect command is the same terminal that had formerly transmitted the reservation command with the designated category ID, and the peripheral device, belonging to the designated category ID has the device ID that is received along with the connect command, is connected to the port 6. In this case, the server 202 connects the designated peripheral device whose presence has been confirmed in Step S94 to the terminal which had transmitted the connect command (Step S98). The server 202 then deregisters the user ID of the terminal and the category ID of the peripheral device connected from the registration list (Step S100). The server 202 transmits an "OK_CONNECTED" message (the message indicating the establishment of the connection) to the designated terminal 50 (Step S102), and terminates the process.

The server 202 described above can reserve an access right to the peripheral device belonging to the category designated by the category ID, even in a case where the peripheral device to be reserved is not yet connected to the server 202 and whose device ID is unknown at the time of reservation, thus guaranteeing the identified terminal the exclusive use of the peripheral device that is connected subsequently after the establishment of the reservation. In the present embodiment, access right may be reserved for respective category that is identified by the category ID. Simultaneous reservation for plural peripheral devices that belongs to different categories can be established.

Fourth Embodiment

Next, the server 302 (network apparatus) according to the fourth embodiment will be described. As aforementioned, the configuration of the server 302 is identical to the server shown in FIG. 1. The server 302 memorizes the relationship between a peripheral device and a terminal of which a connection has been established after the reservation thereof. The server 302 memorizes the history, or log, of connection made between the peripheral device and the terminals which had transmitted the reservation command to that peripheral device. When the server 302 detects a newly connected peripheral device, the server 302 checks, by referring to the memorized history, whether or not the newly connected peripheral device had been connected with the terminal before. If the newly connected peripheral device had been connected at least once to the given terminal prior to the current request of reservation, the server 302 automatically reserves the newly connected peripheral device to the terminal recorded in the history. The server 302 conducts the following processes as well as the process conducted by the server 102 of the second embodiment.

Figure 10:
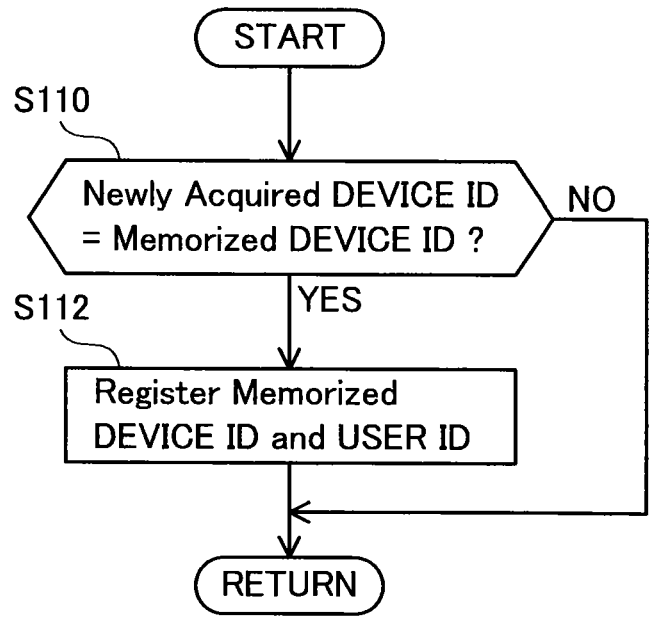
FIG. 10 is a flowchart of a process conducted by a server according to a fourth embodiment.

After the execution of Step S28 of FIG. 4 and Step S64 of FIG. 7, the server 302 memorizes the device ID of the peripheral device and the user ID of the terminal connected with each other. When the server 302 detects a peripheral device is newly connected to the port 6 after the aforesaid memorizing has been executed, the server 302 executes processes represented in a flowchart of FIG. 10. The server 302 acquires a device ID of the newly connected peripheral device. Then, the server 302 checks whether or not the acquired device ID of the newly connected peripheral device is identical with one of the memorized device IDs (Step S110). When a match is obtained (YES in Step S110), the server 302 registers the memorized device ID (which is identical to the device ID of the newly connected peripheral device) and the user ID in the registration list (Step S112). The registration process reserves the peripheral device for the exclusive connection to the terminal. Through the process of the flowchart of FIG. 10, the peripheral device with which the terminal had once been reserved and connected before is reserved again automatically.

The server 302 has a timer (not shown) for measuring elapsed time and conducts the following process with the use of the timer. After Step S12 of FIG. 3, which is the step of setting a reservation, the server 302 starts the timer. If the process at Step S28 of FIG. 4, which is the step of connecting a terminal and a peripheral device in accordance with the reservation) is not performed before a predetermined period of time elapses, the server 302 executes the process of Step S30 despite the lack of receipt of the connect command. As in the above case, after Step S46 of FIG. 6, which is the step of setting a reservation, the server 302 starts the timer. When Step S64 of FIG. 7 is not executed before a predetermined period of time elapses, the server 302 executes the process of Step S66 despite the lack of receipt of the connect command. In a case where the connection is not established even if a predetermined period of time has passed after the reservation was established through the performance of the aforesaid processes, the server 302 automatically cancels the reservation.

It should be noted that, even in the server 2 according to the first embodiment and the server 202 according to the third embodiment, the same function as that of the server 302 according to the fourth embodiment can be implemented by providing them with the registration list described in the second embodiment (the list in which the device IDs and user IDs associated each other are registered) and the timer as described in the above embodiment.

Fifth Embodiment

In the above described embodiments, each server rejects respective access to the peripheral devices 72 and 70 when the access is requested from terminals other than the terminal that had been identified by the user ID received with the reservation command. The peripheral device 72 of which a reservation can be established, is a device that is newly connected to the port 6 after the reception of the reservation command. On the other hand, the peripheral device 70 of which a reservation can be established, is a device that has already been connected to the port 6 at the time of the reception of the reservation command, and which is not accessed by any of the terminals 50 at that time. The server according to the fifth embodiment, only the access to the peripheral device 72 which is to be connected to the port 6 after the reception of the reservation command is to be reserved. In other words, the server of the fifth embodiment allows accesses to the peripheral device 70 which has already been connected to the port 6 at the time of the reception of a reservation command, even if the reservation to the not yet connected peripheral device 70 has been made. Through the use of the server according to the fifth embodiment, the peripheral device 70 that is already connected at the time of the reception of a reservation command can be accessed from any of the terminals other than the terminal 50 which transmitted the reservation command. In other words, even in a case where a reservation command has been issued without designating the device ID, the server allows the peripheral device already connected to itself before receiving the reservation command to be accessed from any one of the other terminals, by limiting the peripheral device to be reserved to the peripheral device that is newly connected to the server after receiving the reservation command.

Figure 11:
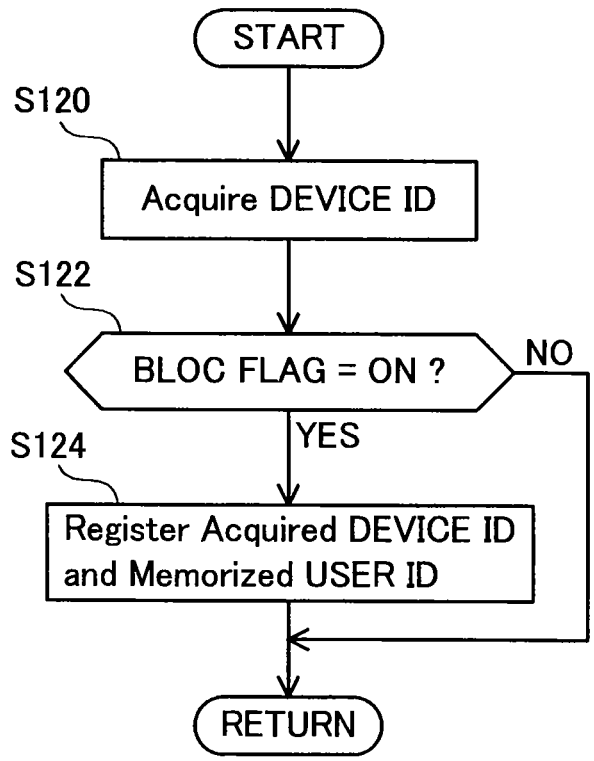
FIG. 11 is a flowchart of a process conducted by a server according to a fifth embodiment.

Now, processes specific to the server of the fifth embodiment will be described. Processes other than the following process are the same as those conducted by the server according to the second embodiment. The server according to this embodiment conducts a process represented in the flowchart of FIG. 11. Each time the server detects a new connection of a peripheral device to the port, the process of FIG. 11 is carried out. The process shown in FIG. 11 is described in the access control program 16 (see FIG. 1) as a separate subroutine, and is executed when the newly connected peripheral device has been detected using the port control program 12.

When a newly established connection of the peripheral device has been detected, the server acquires a device ID of the detected peripheral device (Step S120). Then, the server checks whether "BLOC FLAG" is "ON" or not (Step S122). When "BLOC FLAG" is "OFF" (NO at Step S122), the server ends the process, because such condition indicates that no reservation is established at that point. When "BLOC FLAG" is ON (YES at Step S122), the server registers the acquired device ID and the user ID received along with a reservation command (Step S124). Here, the user ID has been memorized in Step S12 of FIG. 3. The "registration" of Step S124 is the same as that to the "reservation list" described in the second embodiment. That is, when having received a reservation command which does not accompany (designate) a specific device ID, the server associates the user ID received along with the reservation command with the device ID that is acquired from the newly connected peripheral device after the reception of the reservation command, and memorizes them in the reservation list. Prior to carrying out the Step S124, the reservation in the reservation list is established without defining a particular device ID that corresponds to the user ID identified with the reservation. However, by the execution of the aforesaid Step S124, the user ID (and the terminal identified by the user ID) of the established reservation is associated with a specific peripheral device to which the identified terminal can make access. On completing the aforesaid process, the success of connection of the new peripheral device may be informed to the identified terminal. The connecting process by the server is the same as that shown in FIG. 7.

The server allows accesses to the peripheral devices having the device ID which is not registered in the registration list. In other words, the peripheral device having the device ID which is not registered in the registration list (i.e., the peripheral device which had already been connected to the server at the time of the reception of the reservation command) can be accessed from terminals other than the terminal 50 which transmitted the reservation command. When newly established connections of plural peripheral devices have been detected after the reception of a reservation command, the server associates the device IDs of the peripheral devices with the user ID received along with the reservation command, and registers them therein. That is, in this case, the server registers plural reservations by one user (one user ID, or one terminal). Since the device IDs can be attached to a connect command even in such a case, the server allows the user of the terminal identified by the user ID received along with the connect command to access only the peripheral devices with the particular device IDs (the device IDs received along with the connect command).

The technical features of the server according to the fifth embodiment may be presented as follows.

(1) Each of the peripheral devices memorize respective device IDs for identifying themselves.

(2) When a newly connected peripheral device has been detected by the port control program (detector), the access control program (access controller) acquires the device ID from the newly connected peripheral device and associates the acquired device ID with the user ID received along with the reservation command, and memorizes them. The access control program thus can easily reject accesses, requested by senders other than a sender identified by the received user ID, to the detected (newly connected) peripheral device (the peripheral device identified by the acquired device ID).

The preferred embodiments of the present invention have been described. The technical features of the servers according to the aforementioned embodiments may be summarized as below.

Each peripheral device may have respective peripheral device ID for identifying themselves. In this case, it is preferable that the severs (network apparatuses) according to the embodiments may each have the following technical features: A communicator may receive, along with a reservation command and a sender ID, a peripheral device ID for identifying a peripheral device to be reserved. An access controller, when a detected peripheral device has the same peripheral device ID as that received, may reject access that is requested by senders other than the sender identified by the received sender ID, to the detected peripheral device. The user may identify the peripheral device to be reserved by way of the peripheral device ID in order to reserve an access right to the device. Plural users may simultaneously reserve respective access right to different peripheral devices (that are yet unconnected peripheral devices).

It is preferable that the servers (network apparatuses) according to the embodiments may each have the following technical features. The communicator may receive a first reservation command which accompanies a peripheral device ID, and a second reservation command which does not accompany a peripheral device ID. When a detected peripheral device has the same peripheral device ID as that received along with the first reservation command, the access controller may reject access to the detected peripheral device requested by senders other than the sender identified by the sender ID received along with the first reservation command. Furthermore, when the detected peripheral device does not have the same peripheral device ID as that received along with the first reservation command, the access controller may reject access to the detected peripheral device requested by senders other than a sender identified by a sender ID received along with the second reservation command. Even in a case where, the server receives the second reservation commands (the reservation commands without device ID) from other senders, and then, receives the first reservation command (the reservation command with device ID) from one sender before a peripheral device is newly detected, the server may process both of the reservation commands respectively. That is, even in such case, the server (network apparatus) may reject access, requested by senders other than the one sender who sends the first reservation command, to the peripheral device having the device ID which is designated by the first reservation command, and may only permit the access requested by the one sender who has transmitted the first reservation command even if the first reservation command has been received after receiving of the second reservation commands. As described in the present embodiment, the first reservation command may hold priority over the second reservation command even in a case where the first reservation command is received later than the second reservation command.

The peripheral devices may each be given a category ID for identifying a category to which the device itself belongs. In this case, it is preferable that the network apparatus according to the invention may have the following technical features. The communicator may receive, along with a reservation command and a sender ID, a category ID for identifying the category of a peripheral device to be reserved. The access controller, when a detected peripheral device has the same category ID as that received, may reject access to the detected peripheral device that is requested by senders other than the sender identified by a received sender ID.

For example, in USB standards, peripheral devices may be classified into different categories, or classes, by their function, or their variation in types, such as audio, mass storage, printing, imaging, and the like. Peripheral devices based on USB standards may each memorize a category ID for identifying the category to which the device itself belongs. They may each transmit to the network apparatus the category ID memorized in itself when being connected to the network apparatus. Using such category IDs, even when they cannot identify the respective unconnected peripheral devices uniquely, users may simultaneously reserve access rights to respective unconnected peripheral devices, provided that the devices belong to different categories.

It is preferable that the network apparatus according to the embodiments may have the following technical features. After accepting access to a detected peripheral device requested by a sender identified by a received sender ID, the access controller may accept the access requested by a sender other than the sender identified by a received sender ID. The access controller may memorize the received sender ID and the peripheral device ID of the detected peripheral device. The access controller, when the connection of the peripheral device having the memorized peripheral device ID has been detected again, may reject accesses to the redetected peripheral device requested by senders other than the sender identified by the memorized sender ID.

After reserving the access right to the unconnected peripheral device, the reserved peripheral device is connected, and the sender who transmitted the reservation command access to the reserved device; the network apparatus may cancel the access restriction to the particular peripheral device automatically. This may allow the other users to access the peripheral device after the terminal which reserves the peripheral device has accessed. There may be cases where a peripheral device which has been accessed by a particular user after the reservation of the access right to the device, is one of the devices of which the user is in charge. Hence, the network apparatus may cancel the access restriction after the user who transmitted the reservation command has accessed the peripheral device designated for the access reservation; when the peripheral device has been reconnected thereto, the network apparatus may automatically give an exclusive access right to the user who transmitted the reservation command previously. The reservation command does not need to be transmitted each time the peripheral device is connected.

When the detector has not detected a peripheral device to be newly connected thereto within a predetermined period of time after receiving a reservation command, the access controller may accept an access to the peripheral device to be newly connected thereto requested by senders other than the sender identified by the received sender ID. Even when the user who reserved the access right has not requested the connection with the peripheral device for some reason over the predetermined time period, the reservation for the access right to the unconnected peripheral device may automatically be canceled.

The specific embodiments of the present invention have been described in detail above; however, they are only examples and do not limit the scope of the appended claims. The techniques disclosed in the claims include various modifications and alterations of the specific embodiments illustrated above. Further, the technical elements described in this specification with reference to the drawings exhibit technical usability alone or in combination; and their combinations are not limited to those in the claims at the time of the application of the invention. Furthermore, the techniques illustrated in the specification and drawings are intended for the simultaneous attainment of plural objects; the attainment itself of one of the objects represents the technical usability.

What is claimed is:

1. A network apparatus capable of being connected with a network and capable of connecting to one or more peripheral devices, and which controls access from terminals on the network to a connected peripheral device, the network apparatus comprising:

a communicator that receives a reservation command and a sender identifier (sender ID) from one of the terminals on the network, wherein the reservation command requires the network apparatus to reserve an access right for a peripheral device that is not yet connected, and the sender ID identifies a sender of the reservation command;

a detector that detects a peripheral device newly connected to the network apparatus and acquires a peripheral device identifier (peripheral device ID) from the detected peripheral device; and an access controller that rejects access to the detected peripheral device from senders other than the sender identified by the received sender ID in a case where the detector detects the newly connected peripheral device; wherein:

the communicator is configured to receive a first reservation command that accompanies the peripheral device ID and a second reservation command that does not accompany the peripheral device ID;

the access controller rejects access to the detected peripheral device from senders other than the sender identified by the received sender ID that is received along with the first reservation command in a case where the detected peripheral device has the same peripheral device ID as the received peripheral device ID accompanied by the first reservation command; and the access controller rejects access to the detected peripheral device from the senders other than the sender identified by the received sender ID that is received along with the second reservation command in a case where the detected peripheral device does not have the same peripheral device ID as the received peripheral device ID accompanied by the first reservation command.

2. The network apparatus as in claim 1, wherein:

the access controller accepts the access to the detected peripheral device from the senders other than the sender identified by the received sender ID after accepting an access to the detected peripheral device from the sender identified by the received sender ID.

3. The network apparatus as in claim 2, wherein:

the access controller memorizes the received sender ID and the peripheral device ID of the detected peripheral device; and the access controller rejects the access to a re-detected peripheral device from the senders other than the sender identified by the memorized sender ID when the detector re-detects a connection of the peripheral device identified by the memorized peripheral device ID.

4. The network apparatus as in claim 1, wherein the access controller accepts the access to the detected peripheral device from the senders other than the sender identified by the received sender ID, in a case where the detector has not detected the newly connected peripheral device for a predetermined period after receiving the reservation command.

5. A network apparatus capable of being connected with a network and capable of connecting to one or more peripheral devices, and which controls access from terminals on the network to a connected peripheral device, the network apparatus comprising:

a communicator that receives a reservation command and a sender identifier (sender ID) from one of the terminals on the network, wherein the reservation command requires the network apparatus to reserve an access right for a peripheral device that is not yet connected, and the sender ID identifies a sender of the reservation command;

a detector that detects a peripheral device newly connected to the network apparatus and acquires a peripheral device identifier (peripheral device ID) from the detected peripheral device; and an access controller that rejects access to the detected peripheral device from senders other than the sender identified by the received sender ID in a case where the detector detects the newly connected peripheral device;

a storage that associates the received sender ID received along with the reservation command and the received peripheral device ID received with the reservation command, and stores the received peripheral device ID and the received sender ID associated with the received peripheral device ID in a case where the communicator receives the reservation command accompanying the peripheral device ID; and a judging module that judges whether the detected peripheral device has the same peripheral device ID as the stored peripheral device ID;

wherein:

the access controller rejects the access to the detected peripheral device from the senders other than the sender identified by the stored sender ID associated with the received peripheral device ID in a case where the judging module judges that the detected peripheral device has the same peripheral device ID as the stored peripheral device ID, and the access controller rejects the access to the detected peripheral device from the senders other than the sender identified by the sender ID received with the reservation command in a case where the judging module judges that the detected peripheral device does not have the same peripheral device ID as the stored peripheral device ID.

6. The network apparatus as in claim 5, wherein:

the access controller accepts the access to the detected peripheral device from the senders other than the sender identified by the received sender ID after accepting an access to the detected peripheral device from the sender identified by the received sender ID.

7. The network apparatus as in claim 6, wherein:

the access controller memorizes the received sender ID and the peripheral device ID of the detected peripheral device; and the access controller rejects the access to a re-detected peripheral device from the senders other than the sender identified by the memorized sender ID when the detector re-detects a connection of the peripheral device identified by the memorized peripheral device ID.

8. The network apparatus as in claim 5, wherein the access controller accepts the access to the detected peripheral device from the senders other than the sender identified by the received sender ID, in a case where the detector has not detected the newly connected peripheral device for a predetermined period after receiving the reservation command.

9. A network apparatus capable of being connected with a network and capable of connecting to one or more peripheral devices, and which controls access from terminals on the network to a connected peripheral device, the network apparatus comprising:

a communicator that receives a reservation command and a sender identifier (sender ID) from one of the terminals on the network, wherein the reservation command requires the network apparatus to reserve an access right for a peripheral device that is not yet connected, and the sender ID identifies a sender of the reservation command;

a detector that detects a peripheral device newly connected to the network apparatus and acquires a category identifier (category ID), from the detected peripheral device, that identifies a category to which the detected peripheral device belongs;

a storage that associates the received sender ID received along with the reservation command and the received category ID received along with the reservation command, and stores the received category ID and the received sender ID associated with the received category ID in a case where the communicator receives the reservation command accompanying the category ID;

an access controller; and a judging module that judges whether the detected peripheral device has the same category ID as the stored category ID;

wherein:

the access controller rejects the access to the detected peripheral device from the senders other than the sender identified by the stored sender ID associated with the received category ID in a case where the judging module judges that the detected peripheral device has the same category ID as the stored category ID, and the access controller rejects the access to the detected peripheral device from the senders other than the sender identified by the sender ID received with the reservation command in a case where the judging module judges that the detected peripheral device does not have the same category ID as the stored category ID.

10. The network apparatus as in claim 9, wherein:

the access controller accepts the access to the detected peripheral device from the senders other than the sender identified by the received sender ID after accepting an access to the detected peripheral device from the sender identified by the received sender ID.

11. The network apparatus as in claim 10, wherein:

the access controller memorizes the received sender ID and the category ID of the detected peripheral device; and the access controller rejects the access to a re-detected peripheral device from the senders other than the sender identified by the memorized sender ID when the detector re-detects a connection of the peripheral device identified by the memorized category ID.

12. The network apparatus as in claim 9, wherein the access controller accepts the access to the detected peripheral device from the senders other than the sender identified by the received sender ID, in a case where the detector has not detected the newly connected peripheral device for a predetermined period after receiving the reservation command.

* * * * *